United States Patent [19]
Moribe et al.

[11] Patent Number: 5,886,979
[45] Date of Patent: Mar. 23, 1999

[54] INFORMATION RECORDING MEDIUM AND METHOD FOR RECORDING AND REPRODUCING INFORMATION TO A MEDIUM TO PREVENT UNAUTHORIZED COPYING

[75] Inventors: Mineo Moribe; Kenichi Utsumi; Zenichi Nagashima; Hiroyuki Kobayashi; Keiichi Murakami, all of Kawasaki, Japan

[73] Assignee: Fujitsu Limitd, Kawasaki, Japan

[21] Appl. No.: 818,010

[22] Filed: Mar. 14, 1997

[30] Foreign Application Priority Data

Oct. 21, 1996 [JP] Japan ................................. 8-278466

[51] Int. Cl.⁶ ............................ G11B 7/24; G11B 13/00
[52] U.S. Cl. ............................ 369/275.3; 369/58; 369/14
[58] Field of Search ................ 369/275.3, 275.1, 369/13, 14, 58, 47, 48, 54, 44.26; 235/487, 454

[56] References Cited

U.S. PATENT DOCUMENTS 5,661,703  8/1997  Moribe et al. ........................ 369/14

FOREIGN PATENT DOCUMENTS 5257816  10/1993  Japan .
5266576  10/1993  Japan .

*Primary Examiner*—Ali Neyzari
*Attorney, Agent, or Firm*—Greer, Burns & Crain, Ltd.

[57] ABSTRACT

An information recording medium wherein the key information is recorded by arrangement of a unit area recorded irreversibly and a unit area not recorded irreversibly to effect the truth judgment of the medium in accordance with the result of whether or not the reproduction of the key information can be effected, the information recording medium where the illegal usage of the medium is adapted to be prevented without inputting the information on to the medium truth judgment into the processing apparatus by provision of the medium firm information, a reproducing method for the same, a truth judging method for the same, and a recording/reproducing apparatus for the same.

21 Claims, 11 Drawing Sheets

F I G. 1 1
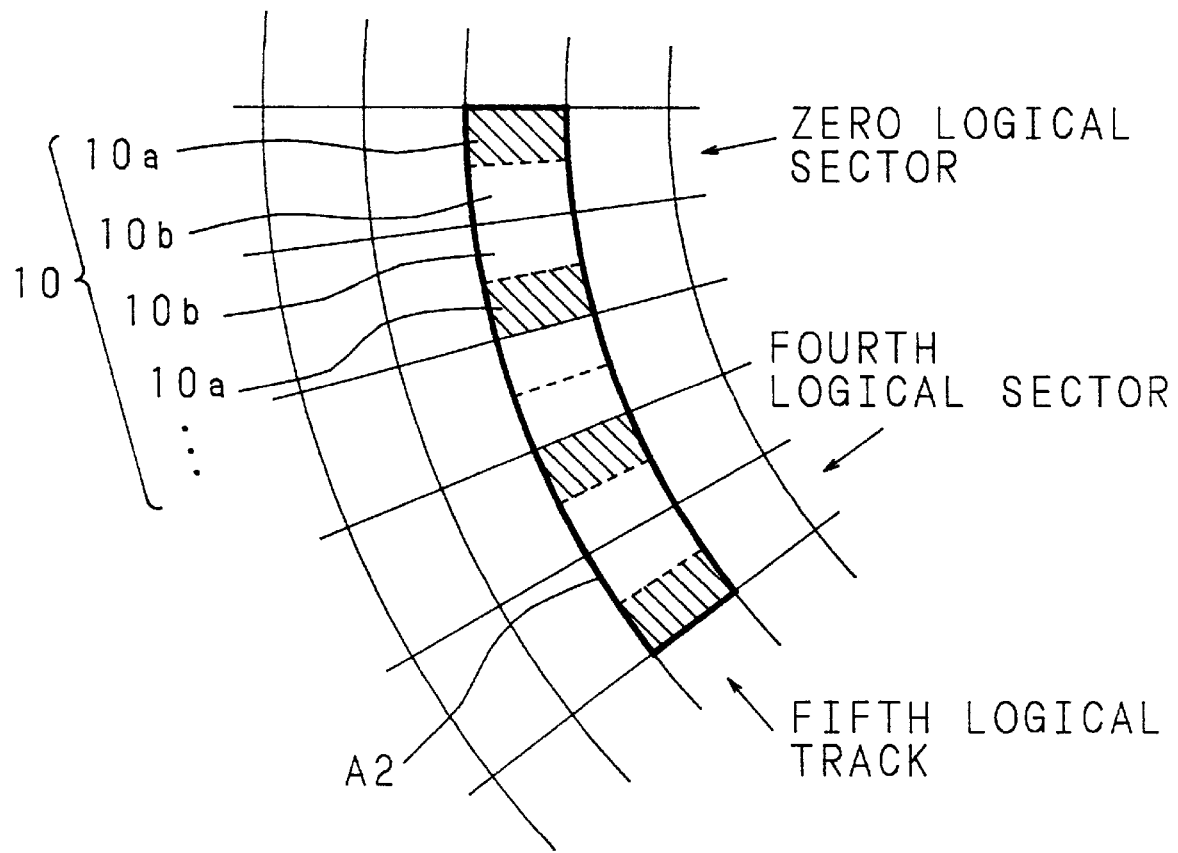

INFORMATION RECORDING MEDIUM AND METHOD FOR RECORDING AND REPRODUCING INFORMATION TO A MEDIUM TO PREVENT UNAUTHORIZED COPYING

BACKGROUND OF THE INVENTION

The present invention relates to an information recording medium where key information is recorded in a medium disk-shaped, tape-shaped or card-shaped, a reproducing method and a truth judging method for the information recording medium capable of preventing illegal usage of the information recorded in the medium by reproducing of the key information, and a recording/reproducing apparatus for recording, and reproducing the information recording medium provided with the key information.

An optical disk, capable of recording mass information with a portable size, is examined for practical use as a recording media core of the rapidly developing multi-media. The optical disk is considered important for managing of the recorded information such as prevention of illegal usage of the information, because the optical disk is capable of recording mass information.

The applicant of the present application proposes a copy preventing method of forming artificial defects in the optical disk by Japanese Patent Application Laid-Open No. 5-26676 (1993) with an eye to preventing the illegal use of the information. The method judges it genuine that both the addresses agree through comparing the respective addresses of an address registration part and a PDL area in the optical disk use with the address registration part with artificially defected addresses recorded on it and the PDL (Primary Defect List) for recording the artificially defected addresses detected by physical format being formed in the optical disk. The medium truth can be judged due to disagreement between both the addresses, because the illegal copy does not allow the PDL area to be copied as the PDL area is formed in non-access area where users cannot access in a normal method. But the information may be used illegally when the user manages to access to the PDL, area of the optical disk by some methods.

Also, the applicant proposes a method of protecting information with the use of media identification codes by Japanese Patent Application Laid-Open No. 5-257816 (1993). The publication describes a method of producing media inherent keys in accordance with the media identification codes inherent to the optical disk to encode, record the information to be recorded with the use of the media inherent keys, and a method of reproducing the encoded information recorded to decode with the use of the media inherent keys. But the methods could not realize the prevention of the illegal use without description of a method of forming medium identification codes.

To establish a method of preventing the illegal usage of such information, the applicant proposes a method of forming medium identification codes by U.S. patent application Ser. No. 08/620,08. This method records the medium identification code of a predetermined hit number irreversibly, namely, unrewritably on the optical disk. The truth or false judgment as to whether or not an optical disk to be used is a genuine product is effected by conduction of an erasing operation on an area where the medium identification codes are recorded, the optical disk proves to be genuine when it is not erased, and the optical disk is prohibited from using the information as an illegal copy when it is erased.

The proposition can prevent the illegal usage of the information. But the reproducing signals of the medium identification code recorded irreversibly may not be recognized as medium identification signals because of smaller signal amplitude.

Also, when reproducing such an optical disk, a special reproduction processing, namely, recording operation and reproducing operation after the erasing operation is effected on the specified area where the medium identification codes are recorded. Thus, a program instructing what type of reproduction processing in which area should be effected is recorded in the optical disk. The data of the program is sent to a computer connected with the recording/reproducing apparatus of the optical disk. The computer gives to the recording/reproducing apparatus instructions for special reproduction processing in accordance with the given data to judge whether or not the optical disk is true or false as described above.

In the above described processing, the data on the medium truth judgment using the medium identification code can analyze data on the medium truth judgment with some operation of the user, because the data are transferred between recording/reproducing apparatus and the computer. There has been a problem where illegal copy can be used by the analysis and information copied illegally from the genuine product can be used.

BRIEF SUMMARY OF THE INVENTION

The present invention is provided to settle such problems as described above. One object of the invention is to provide an information recording medium capable of correctly reproducing key information and preventing illegal usage of information through formation of the key information by arrangement of a first irreversible area(s) where information cannot be recorded correctly and a second non-irreversible area(s) where information can be recorded normally.

An information recording medium of the invention comprises on an information recording area a first unit area(s) recorded irreversibly; and a second unit area(s) not recorded irreversibly, wherein predetermined key information is recorded by the arrangement of the first unit area(s) and the second unit area(s).

Also, the information recording medium of the invention comprises plural unit areas composed of a plurality of bits on an information recording area, the unit areas having an irreversible unit area(s) recorded irreversibly, and a non-irreversible unit area(s) not recorded irreversibly, wherein a predetermined key information is recorded by the arrangement of the irreversible unit area(s) and non-irreversible unit area(s).

Further, the information recording medium of the invention is characterized in that each of the unit areas is a sector determined as an area divided in the length direction of a track which is the information recording area.

Further, the information recording medium of the invention is characterized in that the key information is identification information for identifying the medium.

Further, the information recording medium of the invention comprises plural unit areas to be defined with addresses on the information recording area, the unit areas having a first unit area(s) where information cannot be recorded normally and a second unit area(s) where information can be recorded normally, wherein the predetermined key information is recorded by the arrangement of the first unit area(s) and the second unit area(s).

Therefore, the key information is recorded in accordance with arrangement of a first unit area(s) and a second unit area(s) or the arrangement of a first area and a second area by determining whether the area is not capable of normally recording the information, namely, the first unit area or the area is capable of normally recording the information, namely, the second unit area for example, for each unit area like sector. The key information can be reproduced correctly without influences by the level reduction, deterioration and so on of the reproduction signals, because the first unit area and the second unit area can be differentiated by whether or not the area can be reproduced normally. The unit area can be one sector, or a plurality of bits of one sector or less or a plurality of bits of one sector or more. When the key information is the key information of, for example, medium true or false, the key information can be reproduced without fail, even if the access frequency is higher due to the medium check, to prevent the illegal usage of the information.

Also, the information recording medium of the invention, having plural unit areas composed of a plurality of bits on an information recording area, wherein a medium firm information for specific recording/reproducing control and a key information indicating the existence of the medium firm information are recorded in one or a plurality of unit areas.

Accordingly, information on specific recording/reproducing control is not given to the processing apparatus connected with the recording/reproducing apparatus when the existence of the key information is confirmed, because the recording/reproducing control is effected within the recording/reproducing apparatus in accordance with the medium firm information. Thus, security of the information on the specific recording/reproducing control is retained.

Further, the information recording medium of the invention is characterized in that the key information is recorded by the arrangement of a first unit area(s) where information cannot be recorded normally and a second unit area(s) where information can be recorded normally.

It is necessary to reproduce the key information for the use of the medium firm information although the security of information on the specific recording/reproducing control can be improved with the use of the medium firm information. Therefore, signals recorded in the area can be differentiated by the result of whether or not the signal recorded in the area can be reproduced normally so that the key information can be reproduced without fail without influences by level reduction, deterioration and so on of the reproduction signals, because the key information is recorded by the arrangement of the first area and the second area, for example, per sector.

Further, the information recording medium of the invention is also characterized in that the key information is identification information for identifying the medium.

Accordingly, the information is improved in security, thus increasing the prevention effect of the illegal usage of the information recorded in the medium when information on the specific recording/reproducing control is one where record/reproduce processing is not effected for illegal product where medium is illegally copied in using identification information different for, for example, each medium as key information.

Further, the information recording medium of the invention having plural unit areas composed of a plurality of bits on an information recording area wherein in the information recording area, a key information recorded by the arrangement of a first unit area(s) where information cannot be recorded normally and a second unit area(s) where information can be recorded normally; address information showing the address of an area where the key information is recorded; and a judging program having a step of reading out the address information to effect an erasing operation on the area where the key information is recorded, a step of reproducing the area where the erasing operation is effected, and a step of judging whether or not reproduction is effected normally in each unit area to correspond to binary values the result of whether or not the normal reproduction is effected, are recorded.

Accordingly, information recorded in the first unit area is reproduced normally, as not erased if the erasing operation is effected, so that '1' is corresponded. Information recorded in the second unit area is not reproduced normally, as all the information such as the synchronizing signals is erased by the erasing operation, so that '0' is corresponded. Key information is thus obtained depending on whether or not the normal reproduction is effected. When the medium is illegal, all the information on the area in which the key information is to be recorded is erased in the erasing operation, because the key information is copied in the normal recording, instead of the irreversible recording. Thus, it is judged that the product is illegal since normal reproduction is not made in all the areas of the key information.

Further, the information recorded medium of the invention having plural unit areas composed of a plurality of bits on an information recording area wherein a key information, on an information recording area, recorded by the arrangement of a first unit area(s) where information cannot be recorded normally and a second unit area(s) where information can be recorded normally; address information showing the address of an area where the key information is recorded, and a judging program having a step reading out the address information to effect an erasing operation on the area where the key information is recorded, a step of recording the predetermined information in the area where the erasing operation is effected, a step of reproducing the area where the predetermined information is recorded, and a step of judging whether or not the reproduction is effected normally in each unit area to correspond to binary values the result of whether or not the normal reproduction is effected are recorded on the information recording area.

Accordingly, information recorded in the first unit area is not erased by the erasing operation so that the subsequent recording is not effected correctly. Thus, the normal reproduction is not reproduced in the reproducing operation after the recording so that '1' is corresponded. Information recorded in the second unit area is erased by the erasing operation so that the subsequent recording is effected normally. Thus, normal reproduction is effected in the reproducing operation after recording so that '0' is corresponded. Key information is obtained depending on whether or not, the normal reproduction is effected correctly in this manner. When the medium is illegal, all the information on the area in which the key information is to be recorded is erased in the erasing operation, and then, the recording is effected, because the key information is copied in the normal recording, instead of the irreversible recording. Thus, it is judged that the product is illegal because of normal reproduction in all the areas of the key information.

Further, the information recording medium of the invention is characterized in that the judging program has a step of judging the agreement between the information corresponding to binary values and the information recorded in advance.

It is judged that a product is genuine if the information obtained by the reproduction of the key information and the information, corresponding to the key information, recorded in the information recording medium in advance are identical in comparison. Thus, further reliable true or false judgment is effected. The information recorded in advance can be recorded in the information recording medium where the key information is recorded, or can be recorded in a different medium.

Also, an object of the invention is to provide a method reproducing an information recording medium capable of judging whether the medium is true or false, and a method of judging the truth or false by reproduction after the erasing operation is effected on the key information formed by the first unit area and the second unit area or by recording the predetermined signal after the erasing operation, and the later reproduction. A method of reproducing the information recording medium of the invention comprises the step of preparing an information recording medium where the key information is recorded, the step of effecting an erasing operation upon an area where the key information is recorded, the step of reproducing an area upon which the erasing operation is effected, the step of judging whether or not the reproduction is effected normally upon each unit area, and the step of deciding respectively whether it is the first unit area or the second unit area in accordance with the result of whether or not the normal judgment is effected.

Thus, as the information recorded in the first unit area is not erased in the erasing operation, the normal reproduction is effected so that '1' is corresponded to the first unit area. Information recorded in the second unit area is not reproduced normally as the information of all the synchronizing signals and so on is erased by the erasing operation so that '0' is corresponded. As the '1' and '0' can be differentiated depending on the result of whether or not the normal reproduction is effected, the key information can be reproduced accurately without influences by the level reduction, deterioration and so on of the reproduction signal.

Also, the method of reproducing the information recording medium of the invention comprises the step of preparing an information recording medium where the key information is recorded, the step of effecting an erasing operation upon an area where the key information is recorded, the step of recording the predetermined information upon an area where the erasing operation is effected, the step of reproducing an area where the predetermined information is recorded, the step of judging whether or not the reproduction is effected normally in each unit area, and the step of deciding respectively whether it is the first unit area or the second unit area in accordance with the result of normal judgment.

Accordingly, the information recorded in the first unit area is not erased by the erasing operation so that the subsequent recording is not effected normally. Thus, the normal reproduction is not reproduced in the reproducing operation after the recording so that '1' is corresponded to the first unit area. The information recorded in the second unit area is erased by the erasing operation so that the subsequent recording is effected normally. Thus, the normal reproduction is effected by the reproducing operation after the recording so that '0' is corresponded to the second unit area. Thus, as the '1' and '0' can be differentiated in accordance with the result of whether or not the normal reproduction is effected, the key information can be reproduced accurately without influences by the level reduction, deterioration and so on of the reproduction signal.

The method of judging the truth of the information recording medium of the invention comprises the step of the preparing an information recording medium where the key information is recorded, the step of effecting the erasing operation upon an area where the key information is recorded, the step of reproducing an area upon which the erasing operation is effected, the step or judging whether or not the reproduction is effected normally in each unit area to correspond to binary values, the step of judging the agreement between information corresponding to the binary values and the information recorded in advance, and the step of deciding the truth of the information recording medium in accordance with the result of the agreement judgment.

Further, the method of judging the truth of the information recording medium of the invention comprises the step of preparing an information recording medium where the key information is recorded, the step of effecting the erasing operation upon an area where the key information is recorded, the step of recording the predetermined information upon an area where the erasing operation is effected, the step of reproducing an area upon which the predetermined information is recorded, the step of judging whether or not the reproduction is effected normally in each unit area to correspond to binary values the result of whether or not reproduction is effected, the step of judging the agreement between information corresponding to the binary values and the information recorded in advance, and the step of deciding the truth of the information recording medium in accordance with the result of the agreement judgment.

Thus, it is judged t hat a product is genuine in the case of the agreement between the key information obtained by the judgment as to whether or not the normal reproduction is effected and the information corresponding to the key information recorded in the information recording medium in advance. Thus, further reliable true or false judgment is effected. The information recorded in advance can be recorded in the information recording medium where the key information is recorded, or can be recorded in a different medium.

Further, an object of the invention is to provide a recording/reproducing apparatus where data on the medium truth judgement is not inputted into the processing apparatus through recording/reproducing control with the use of the medium firm information when the engaged information recording medium has been judged to be provided with the medium firm information.

A recording/reproducing apparatus of the invention comprises a first memory part for storing original firm information for controlling the recording/reproducing of information, a judging part for judging the existence of a key information indicating the existence of the medium firm information for controlling the specific recording/reproducing in the information recording medium, a second memory part in which the medium firm information is read and stored when the information recording medium is judged to have the key information by the judging part, and an instruction part for instructing the switching of the original firm information and the medium firm information for the usage thereof.

Accordingly, a specific recording/reproducing control is effected on the information recording medium with the use of the medium firm information when the key information has been judged to be recorded in the information recording medium. The information on the specific recording/reproducing control is not given to the processing apparatus connected with the recording/reproducing apparatus, because the recording/reproducing control in accordance with the medium firm information is effected within the recording/reproducing apparatus. Thus, the security of the information on the specific recording/reproducing control is retained.

Also, the recording/reproducing apparatus of the invention is provided with a third memory part where the identification information is read and stored when the judgment part has judged the existence of the identification information with the key information being the identification information for identifying the medium.

Thus, when the key information is, for example, the identification information different for each medium, the identification information stored in the third memory part can be used for identification of identification information, encoding, decoding or the like. Also, when the formation on the specific recording/reproducing control is information that the record/reproduce processing is not effected on the illegal product where the medium is illegally copied, the security of the information is improved, thus resulting in increased preventing effect of the illegal use of the information recorded in the medium.

The above and further objects and features of the invention will more fully be apparent from the following detailed description with accompanying drawings.

BRIEF DESCRIPTION OF THE SEVERAL VIEWS OF THE DRAWINGS

FIG. 11 is an enlarged view of another key record area of the information recording medium of the invention.

DETAILED DESCRIPTION OF THE INVENTION

Figure 1:
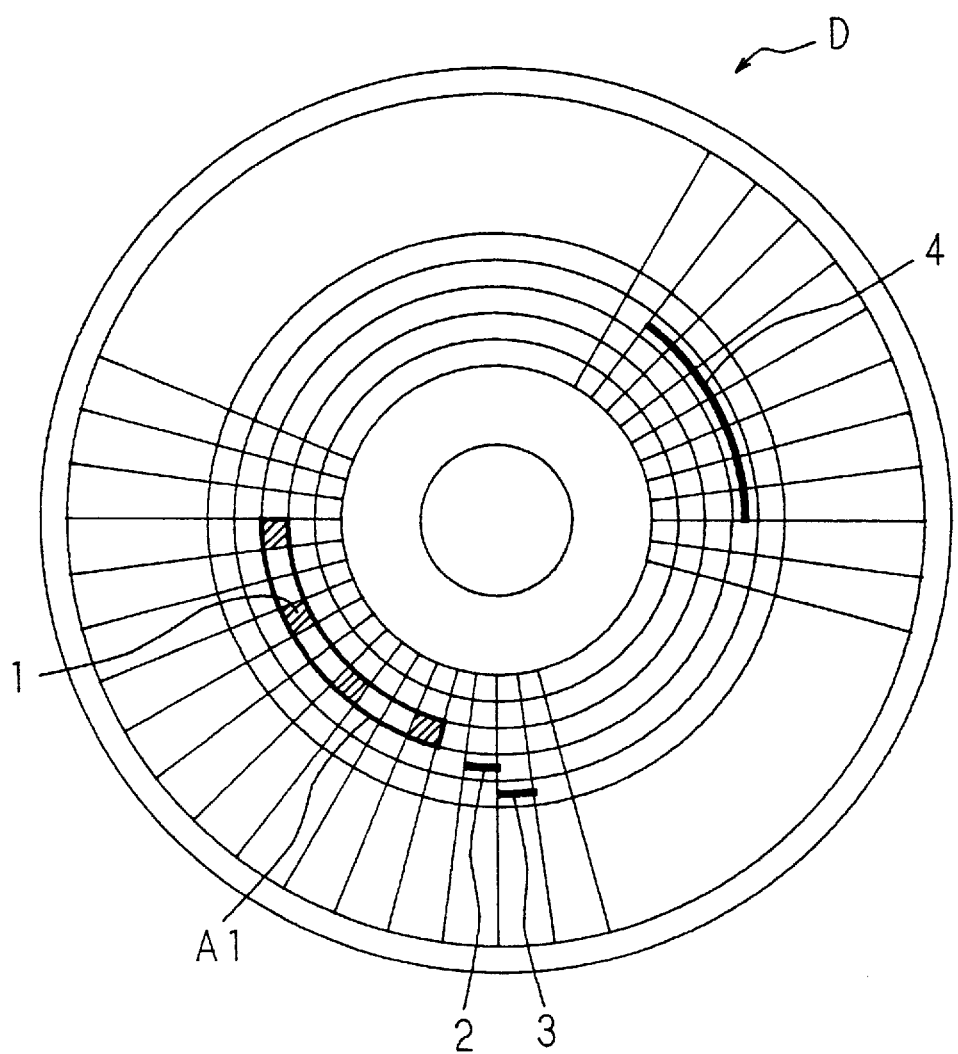
FIG. 1 is a schematic plane view showing the construction of an information recording medium of the invention.

The present invention will be described concretely in accordance with the drawings showing the embodiments.
First Embodiment FIG. 1 is a schematic plane view showing the construction of the information recording medium of the invention. The information recording medium D is a magneto-optical disk being in accordance with the ISO/IEC 13963 Standard. Identification information 1, key recording area information 2, identification codes 3, and medium firm information 4 are recorded in the optical disk D. The identification information 1, which is key information different for each medium, is formed in a key recording area A1 composed of a plurality of sectors. The key recording area information 2 is the address information about the key recording area A1.

Figure 2:
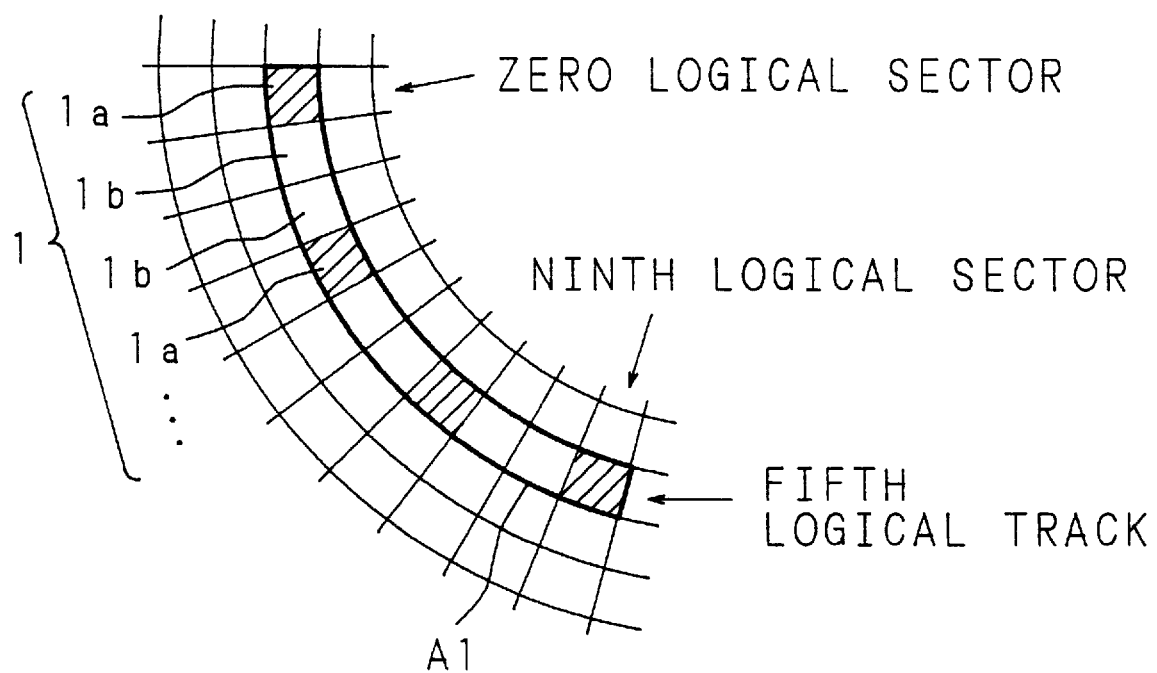
FIG. 2 is an enlarged view of a key recording area of FIG. 1.

FIG. 2 is an enlarged view of a key recording area A1 shown in FIG. 1. The key recording area A1 shows a zero logical sector through a ninth logic sector of the fifth logical track, having successive ten sectors. The zero, third, sixth and ninth logical sectors are a first sectors 1a, 1a, . . . where test patterns in accordance with the ISO/IEC 13963 Standard are recorded irreversibly in advance. The first sectors 1a, 1a, . . . are the areas which is not capable of normal recording. First, second, fourth, fifth, seventh, and eighth logical sectors are a second sectors 1b, 1b, . . . which is capable of normal recording. The identification information 1 is composed of the first sectors 1a and the a second sectors 1b combined. The identification code 3 is a code where the first sector 1a and the second sector 1b of the key recording area A1 is corresponded to '1' and '0' respectively, in which '1001001001' is recorded. Also, the medium firm information A is information on the control of the information recording/reproducing peculiar to the information recording medium D.

Figure 3:
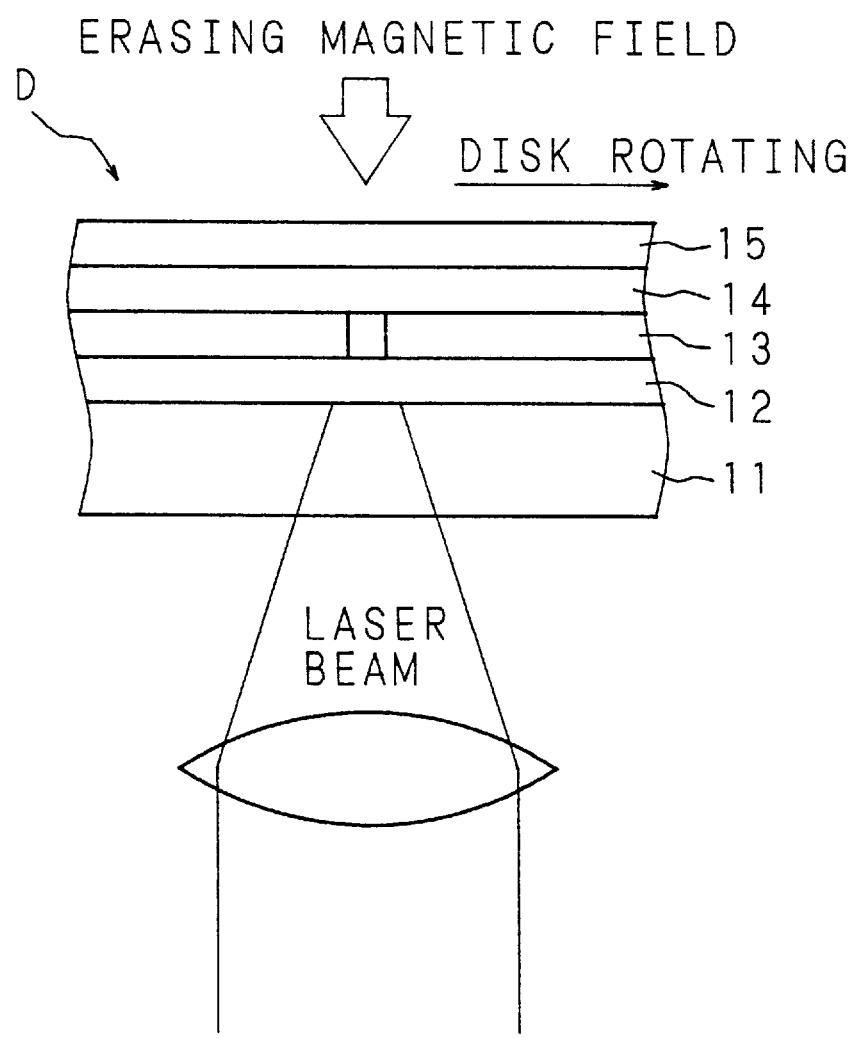
FIG. 3 is view for illustrating a method of recording the identification information of a first embodiment.

Procedures of producing the information recording medium D of such construction and recording conditions of the identification information will be described. FIG. 3 is a view for illustrating a recording method of the identification information 1 in a first embodiment. The information recording medium D, has substrate 11 made of carbonate resin of 1.2 mm in thickness, φ86 mm in outer diameter, with pregroove of 1.41 μm in track pitch and header signal being formed therein. A dielectric layer 12 formed of Y—SiO$_2$, a magnetic layer 13 formed of DyFeCo, a dielectric layer formed of Y—SiO$_2$, and a reflection layer 15 formed of Al are laminated in this order on the substrate 11. The information recording medium D of such film construction held an optimum recording power of 8 mW when the rotation was made with linear speed of 9 m/sec. after the physical formatting.

An optical disk tester on the market is used. Test patterns in accordance with the ISO/IEC 13963 Standard are recorded irreversibly on the respective sectors of the zero, third, sixth and ninth logical sectors under the irradiation of laser beams of the linear speed of 3 m/sec., 25 mW in recording power during the application of the erasing direction of the magnetic field direction upon the information recording medium D. The irreversibly recorded area becomes an irreversibly recorded condition, namely, unrewritable and non-erasable condition. The detailed description about the irreversible recording method and the reproduction for the same is omitted, because it is described in the U.S. patent application Ser. No. 08/620,083. The standard clocks recorded respectively in the zero, third, sixth and ninth logical sectors are set later than normal, because the linear speed is later than the normal recording. The key recording area 2, the identification code 3 and the medium firm information 4 are recorded respectively in a predetermined position by the usual optical magnetic recording system.

Figure 4:
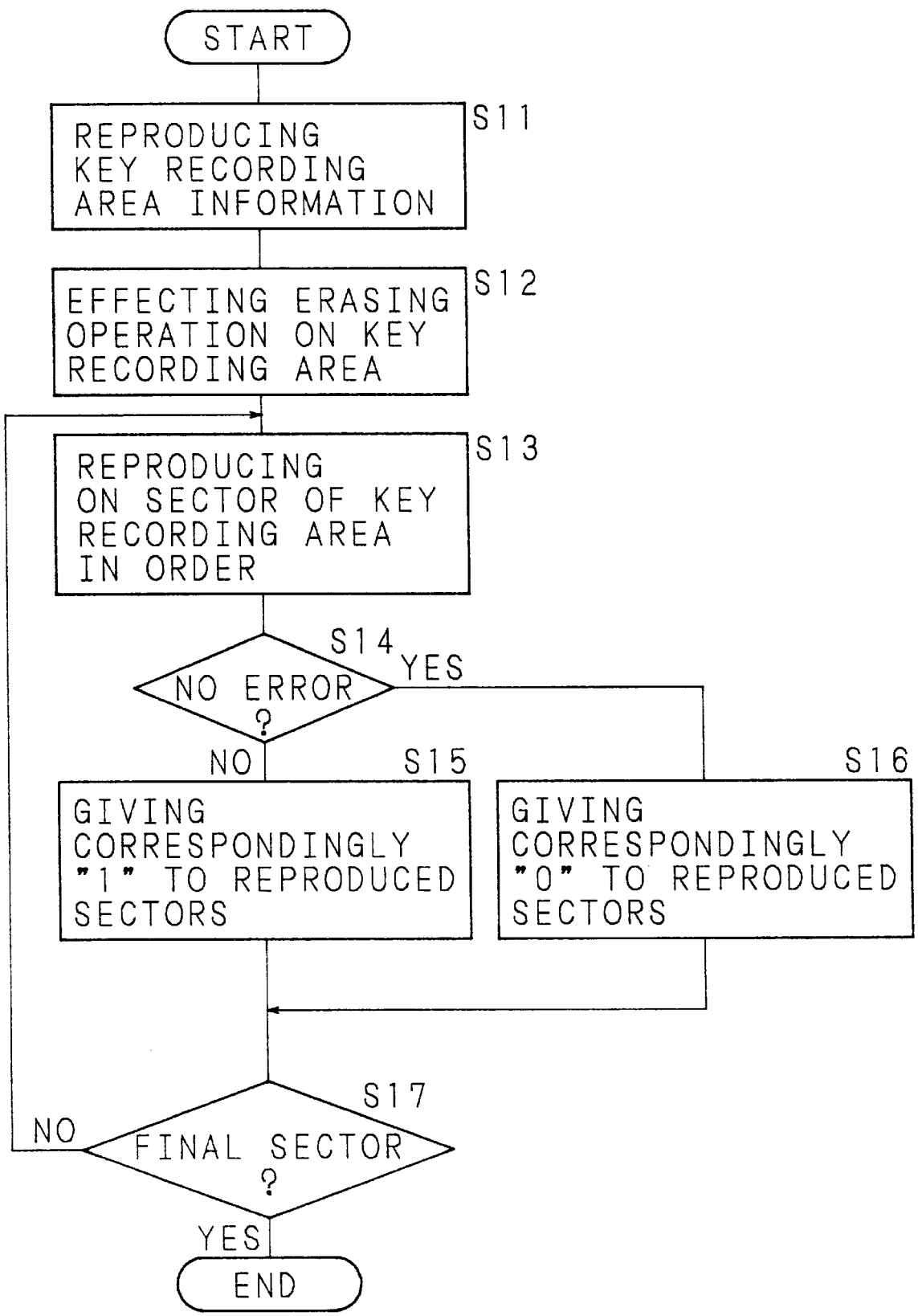
FIG. 4 is a flow chart showing the reproducing procedures of the identification information in the first embodiment.

Procedures for reproducing the identification information of the information recording medium D produced as described above will be described. FIG. 4 is a flow chart showing the procedures of reproducing the identification information in a first embodiment. At first, the information recording medium D is caused to rotate at 3600 rpm (equivalent to 9 m/sec. in the key recording area A1). The key recording area information 2 of the information recording medium D is reproduced to get the address of the key recording area A1 (step S11). After effecting an erasing operation by the application of the laser beam of the erasing power of 9 mW upon the key recording area A1 (step S12), the key recording area A1 is reproduced in the order from the zero logical sector to the ninth logical sector (step S13).

By making use or the result of the reproduction, it is judged whether or not an error is caused in each logical sector (step S14). As described in the U.S. patent application Ser. No. 08/620,083, the first sectors 1a (zero, third, sixth and ninth logical sectors) recorded irreversibly are reproduced without errors, since the information is not erased even if the erasing operation is applied. In the second sectors 1b (first, second, fourth, fifty, seventh and eighth) not recorded irreversibly, errors are caused, because all the information is erased. At the step S14, '1' is given correspondingly to the sectors reproduced without errors (step S15). '0' is given correspondingly to sectors having errors, namely, a defective sectors (step S16). And it is judged whether or not the reproduction sector is a final sector (step S17). When the sector is not final, it returns to the sector S13 to continue the reproduction processing of the sector. When the sector is final, the reproduction processing of the identification information 1 is completed. The '0' and '1' are given correspondingly to each sector of the key recording area A1, resulting in the identification information 1 expressed with the identification code of '1001001001'.

The identification information 1 inherent to the medium can be reproduced by the reproduction procedures as described above. The correct identification information 1 can be obtained even if the amplitude of the reproduction signal is small, because the result of whether or not the reproduction signal is normally obtained is given to '1' or '0' correspondingly, not because the identification information is obtained directly from the reproduction signal of the test pattern recorded irreversibly.

The usual data is erased by the reproduction processing of the identification information 1 when the usual data has been recorded in the second sector 1b of the identification information 1. To prevent it, the identification information 1 is preferable to be recorded in an area where the user can never conduct the recording operation by mistake.

Second Embodiment

Figure 5:
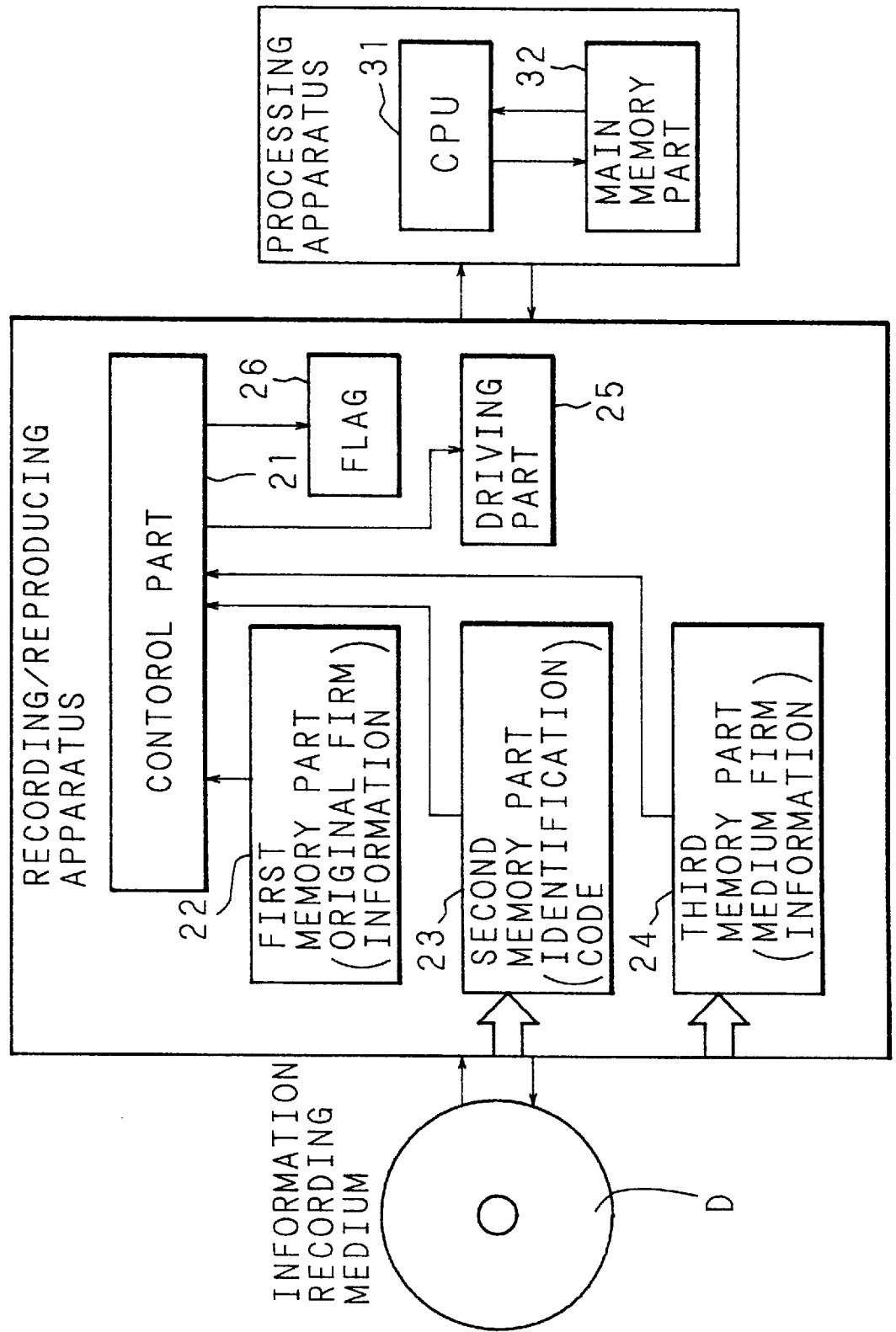
FIG. 5 is a block diagram showing the construction of a recording/reproducing apparatus in a second embodiment.

FIG. 5 is a block diagram showing the construction of the recording/reproducing apparatus for effecting recording/reproducing processing in the information recording medium, where a processing apparatus connected with the recording/reproducing apparatus is shown. In the drawing, the information recording medium D is a magneto-optical disk shown in FIG. 1, where the identification information 1, the key recording area information 2, the identification code 3 and the medium firm information 4 are recorded. In the first sector 1a of the identification information 1, which is different from that of the first embodiment, the test patterns not in accordance with the ISO/IEC 13963 Standard are recorded irreversibly. The conditions of the irreversible recording, and the film construction or the like of the magneto-optical disk, and other conditions are similar to those of the first embodiment. The test pattern to be recorded irreversible is preferable not to be in accordance with the standard to avoid becoming the same pattern as the test pattern based on the standard recorded usually described later, although it is not necessarily to be in non-conformity to the standard.

The recording/reproducing apparatus comprises a first memory part 22 where the original firm information is stored for controlling the recording/reproducing processing about all the information recording media possible to be put, a second memory part 23 for storing the identification code 3 of the information recording medium D, a third memory part 24 for storing the medium firm information 4 of the information recording medium D, a driving part 25 for controlling the optical head for recording/reproducing the information in the information recording medium D, a flag 26 for notifying whether the first memory part 22 or the third memory part 24 is used for processing, and a controlling part 21 for inputting and outputting signals to these to control the recording and reproducing to the information recording medium D. Also, the processing apparatus is provided with a CPU 31 and a main memory part 32. The CPU 31 fetches the data of the main memory part 32 to calculate them for storing them in the main memory part 32. The recording/reproducing apparatus, connected with the processing apparatus, outputs to the processing apparatus the signals of the program recorded in the information recording medium D and receives from the processing apparatus the instructions of the recording and reproducing to the information recording medium D. The recording/reproducing apparatus effects the recording/reproducing operation by the driving part 25 in accordance with the original firm information usually by normally receiving the instructions.

Figure 6:
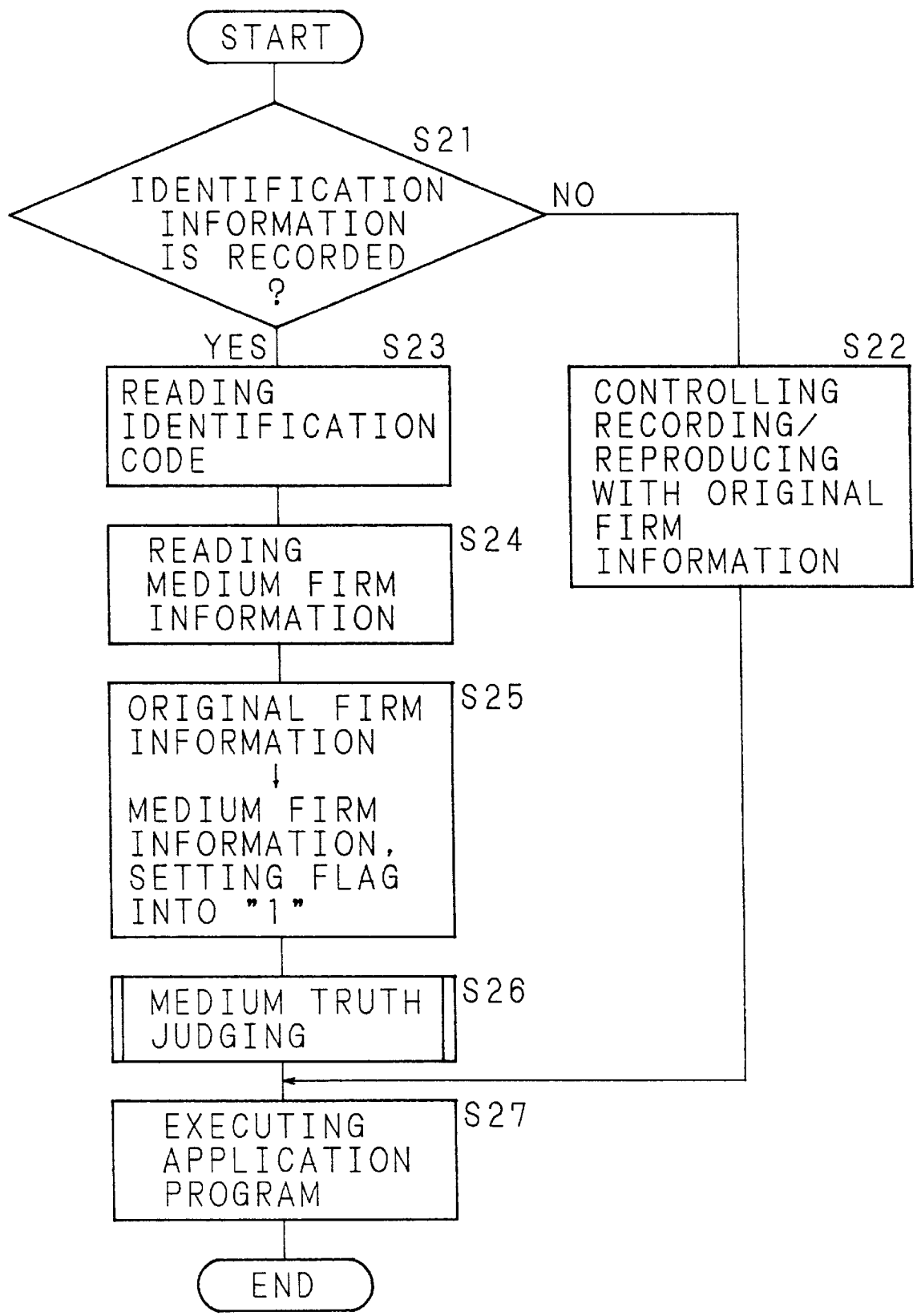
FIG. 6 is a flow chart showing the control processing procedures of the recording/reproducing apparatus in the second embodiment.

FIG. 6 is a flow chart showing the control processing procedures of the recording/reproducing apparatus in the second embodiment. The processing procedures of the recording/reproducing apparatus is described in accordance with the flow chart of FIG. 6 in the execution of, for example, an application program recorded in the information recording medium D when the information recording medium D is put in the recording/reproducing apparatus. At first, it is judged whether or not the identification information 1 is recorded in the information recording medium D (step S21). This is judged by whether or not the key recording area information 2 is recorded in the information recording medium D. The usual recording/reproducing control is effected with the original firm information when the identification information 1 is not recorded (step S22).

When the identification information 1 is recorded, the identification code 3 is read into the second memory part 23 of the recording/reproducing apparatus (step S23), and the medium firm information is read into the third memory part 24 (step S24). And the controlling part 21 switches the original firm information to the medium firm information and sets a bit of the flag 26 into the '1' to notify change in the firm information (step S25). And a medium truth judging operation is effected to see whether or not the put information recording medium D is a genuine product (step S26).

Figure 7:
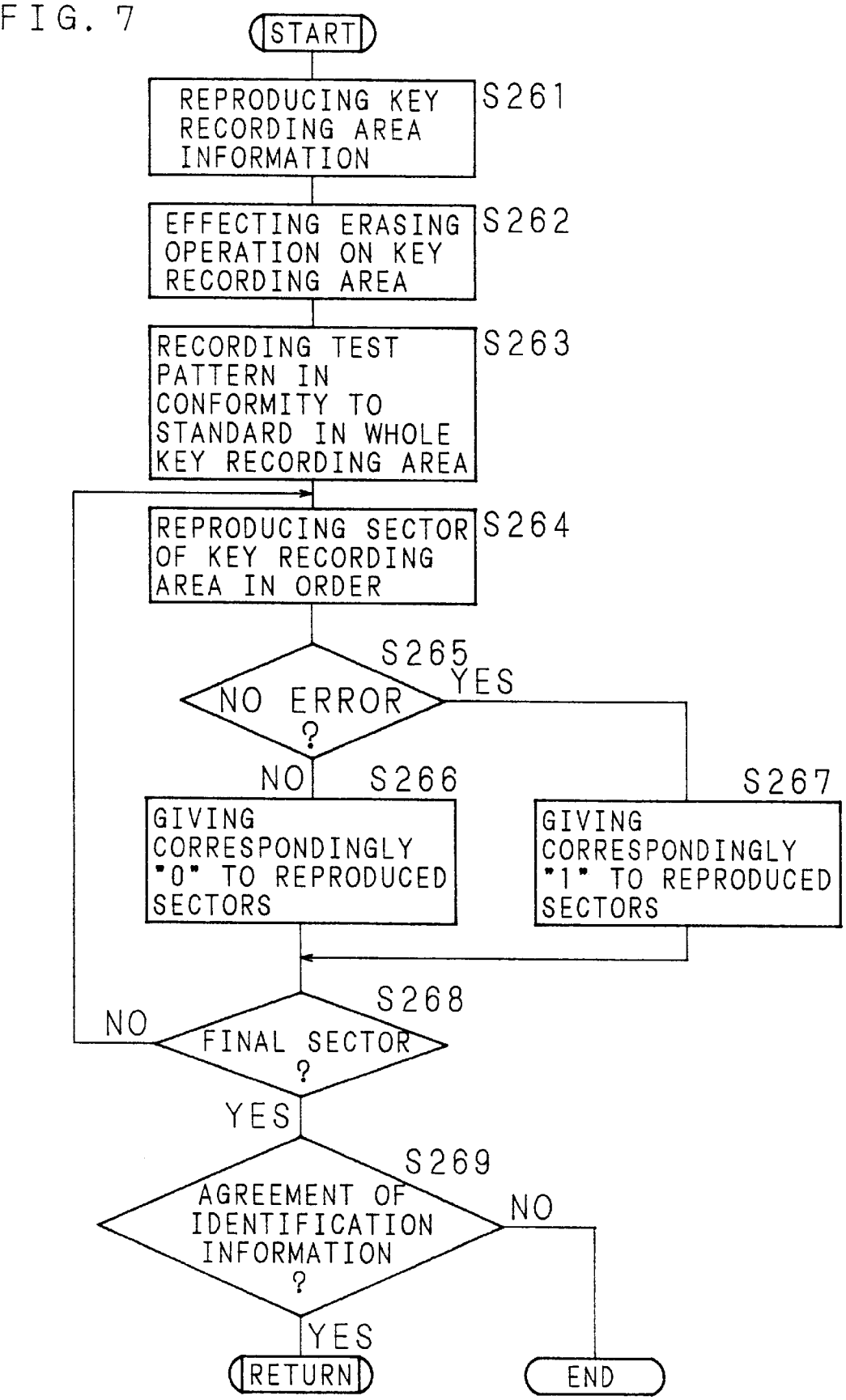
FIG. 7 is a flow chart showing the procedures of a medium truth judging processing of FIG. 6.

FIG. 7 is a flow chart showing the procedures of the medium truth judging processing of the step S26. In the judgment as to whether or not the medium is true or false, at first, the key recording area information 2 is reproduced (step S261) to effect the erasing operation throughout the obtained key recording area A1 (step S262). Then, the test pattern is usually recorded, in conformity to the standard, with the recording power of 8 mW, in the whole key recording area A1 (step S263). At this time, a verifying operation after the recording, namely, the processing for reproducing and confirming whether or not the recorded information is correctly recorded, is not effected.

After the test pattern recording operation, the sector of the key recording area A1 is reproduced in order (step S264). It is judged by the result of the reproduction whether or not the error is produced (step S265). The first sectors 1a (zero, third, sixth and ninth logical sectors) recorded irreversibly are not erased even if the erasing operation is effected and thus, the test patterns recorded at the step S263 cannot be reproduced. Thus, errors are caused in the first sector 1a. So, the first sector 1a is judged which in a defective sector. In the second sectors 1b (first, second, fourth, fifth, seventh and eighth) not recorded irreversibly, the test patterns are recorded at the step S263, and are reproduced without errors.

The '1' is given correspondingly to the sector with errors (step S267). The '0' is given correspondingly to the sector without the error (step S266).

When the sector is not to be final by the judgment whether or not the reproduction sector is final (step S268), the step returns to the step S264 to effect the reproduction processing of the next sector. When the sector is judged to be final, the '1' and '0' are given correspondingly to each sector of the key recording area A1 for comparison between the identification information expressed with the identification code of '1001001001' and the identification code 3 read out at the step S23 (step S269). When the code is not in agreement with the identification code 3, the recording/reproducing apparatus suspends its operation by the judgment that the information recording medium D is an illegal copy. When the code is in agreement with the identification code 3, the step advances to the step S27 of FIG. 6 on the judgment that the product is genuine to execute the application program (step S27). The identification code 3 can be recorded in the same medium where the identification information 1 is recorded, or the identification information 1 recorded in the different medium can be obtained. Also, the erasing conditions, the usual recording conditions and the reproducing conditions of the test patterns are similar to those of the first embodiment.

Figure 8:
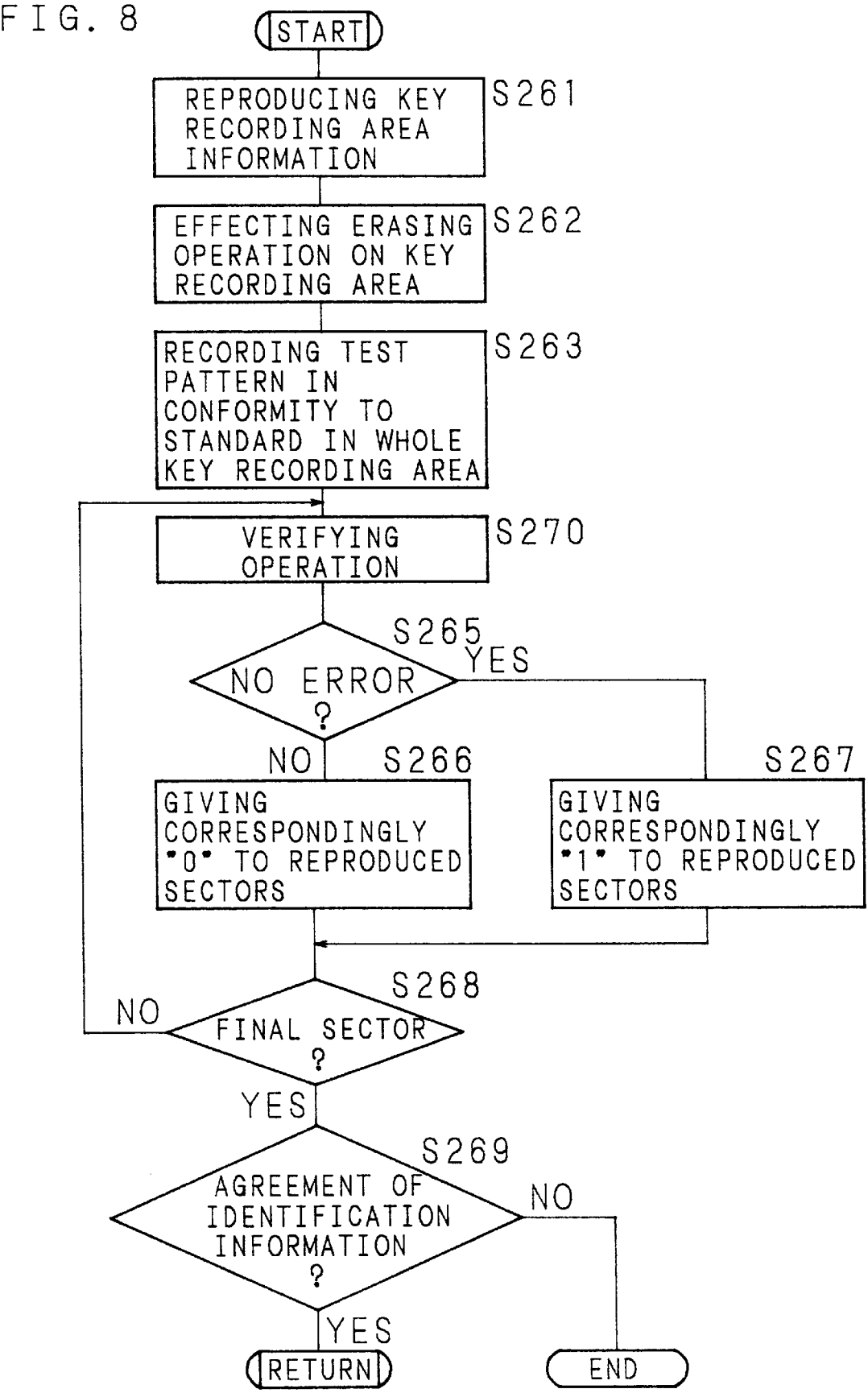
FIG. 8 is a flow chart showing another procedure of the medium truth judging processing of FIG. 6.

Although the recording is adapted to be effected without a verifying operation at the step S263, in the above described medium truth judgment processing, the '1' and '0' may be given correspondingly to each sector depending on the existence of the error in the case, by the verifying operation after the recording of each sector. FIG. 8 shows the flow chart of the procedure of the medium truth judgement processing.

At the step S263, the test pattern in accordance with the standard is recorded in the order of the sectors of the key recording area A1 being immediately followed by effecting a verifying operation (step S270). It is judged whether or not the error is caused by the results of the verifying operation (step S265). In the first sectors 1a (zero, third, sixth and ninth logical sectors) recorded irreversibly, the test patterns cannot be recorded correctly at the step S263 now that the recorded patterns are not erased even if the erasing operation is effected. Thus, this sector is judged which is a defective sector. In the second sectors 1b (first, second, fourth, fifth, seventh and eighth) not recorded irreversible, the test patterns are recorded correctly at the step S263, thereby causing no errors. The '1' is given correspondingly to the sector with errors (step S267). The '0' is given correspondingly to the sector without the error (step S266). The step returns to the step S263 to record the test patterns of the next sector when the sector is judged not to be final by the judgment whether or not the reproduction sector is final (step S268). When the sector is judged to be final, the identification information 1 is obtained (step S269). The description of other processings is omitted as they are similar to those of FIG. 7.

Also, although the medium truth judgment processing in the control processing procedures of the above described recording/reproducing apparatus is adapted to effect the usual recording after the erasing operation has been effected upon the key recording area A1 as shown in FIG. 7 and FIG. 7, it will not be limited to this, and the reproduction can be effected after the application of the erasing operation upon the key recording area A1 as shown in the first embodiment in FIG. 4.

Also, the recording/reproducing processing in the step S26 and the step S27 of FIG. 6 is controlled with the use or the medium firm information 4. As the control contents, for example, the controlling operation is effected not to effect the alternate processing in the usual recording operation upon the key recording area A1 during the medium truth judgment processing in the step S26. The controlling operation can prevent accessing to the other sector by the alternate processing in the recording of the test patterns upon the first sector 1a by the medium truth judgment processing.

Although the address information where identification information 1 is recorded is used in the present embodiment as key information notifying that the medium firm information 4 is recorded, it is not limited to this, and some signals can be recorded in an area to be accessed when the information recording medium D is put into the recording/reproducing apparatus.

It is preferable to have the medium firm information to be recorded in the information recording medium D, the application program and the other programs encoded with the use of the identification code. In this case, the program contents are decoded with the use of the identification information read into the second memory part 24 during the execution of the application program at the step S27.

Further, the recording/reproducing apparatus may be arranged so that the original firm information and the medium firm information may be used through switching in accordance with the type of the instruction of the recording/reproduction to be given from the processing apparatus. For example, the medium firm information may be used in the medium truth judgment processing of the step S26, or the original firm information may be used in the processing of the application program of the step S27.

An effect similar to that of the first embodiment is obtained in the second embodiment by the processing procedures described above. Namely, the truth of the information recording medium D can be judged certainly without receiving the influences upon the level of the reproducing signal. Also, the information recording medium D is provided with the medium firm information 4 for its own recording/reproducing controlling, and the medium firm information 4 can be switched for usage from the original firm information when the information recording medium D has been judged to be genuine. Thus, the illegal use of the information can be prevented without fail because of no transmission of the signal for the truth judgment of the information recording medium D between the recording/reproducing apparatus and the processing apparatus. Further, the recording/reproducing apparatus can effect the exclusive recording/reproducing control on the put medium by storing the medium firm information in the recording/reproducing apparatus from the medium, because the medium firm information is recorded in the medium. The recording/reproducing apparatus can effect the exclusive recording/reproducing control of each medium by the loading of the medium, and the recording/reproducing apparatus has only to have the minimum original firm information.

Although it is explained that the identification information 1 is recorded in an area where the user can not recorded even by mistake of the recording operation (area beyond the user's access) in the above described second embodiment. Similar medium truth judgement processing can be effected even when the identification information 1 has been recorded in an area easy to access by the user. In this case, with such program of control contents where the usual data is not recorded being recorded in the information recording medium D, the usual data is adapted to be controlled in recording in accordance with the program. At this time, it is preferable to have the encoded program recorded. Also, with the medium firm information of control contents where the usual data is not recorded in the key recording area A1 being recorded in the information recording medium D, the usual data may be controlled in recording in accordance with the medium firm information.

Also, although it is explained the procedures of reading out the identification information 1 from the all the areas of the key recording areas A1 for the truth judgment of the medium to obtain the '1001001001' in the above described first and second embodiments, it will not be limited to this, and the judgment as to whether the sector is the first sector 1a or the second sector 1b may be effected about only the partial sector of the key recording area A1. At first, for example, at least one sector address corresponding to the first sector 1a is obtained from the key recording area information 2 and the identification code 3. The above described truth judgment processing such as erasing operation, usual recording and reproduction processing are effected for the sector of the address (see FIG. 7). As the result, the information recording medium D is a genuine product when the sector has been judged to be the first sector 1a. The medium D is judged to be an illegal copy product when the sector has been judged to be the second sector 1b. In such a medium truth judgment processing, time for the medium check can be shortened by the use of it each time a different program is actuated or for a medium check effected for each predetermined time after the truth judgement has been once effected in the processing shown in FIG. 4. FIG. 7 and FIG. 8.

Third Embodiment

Figure 9:
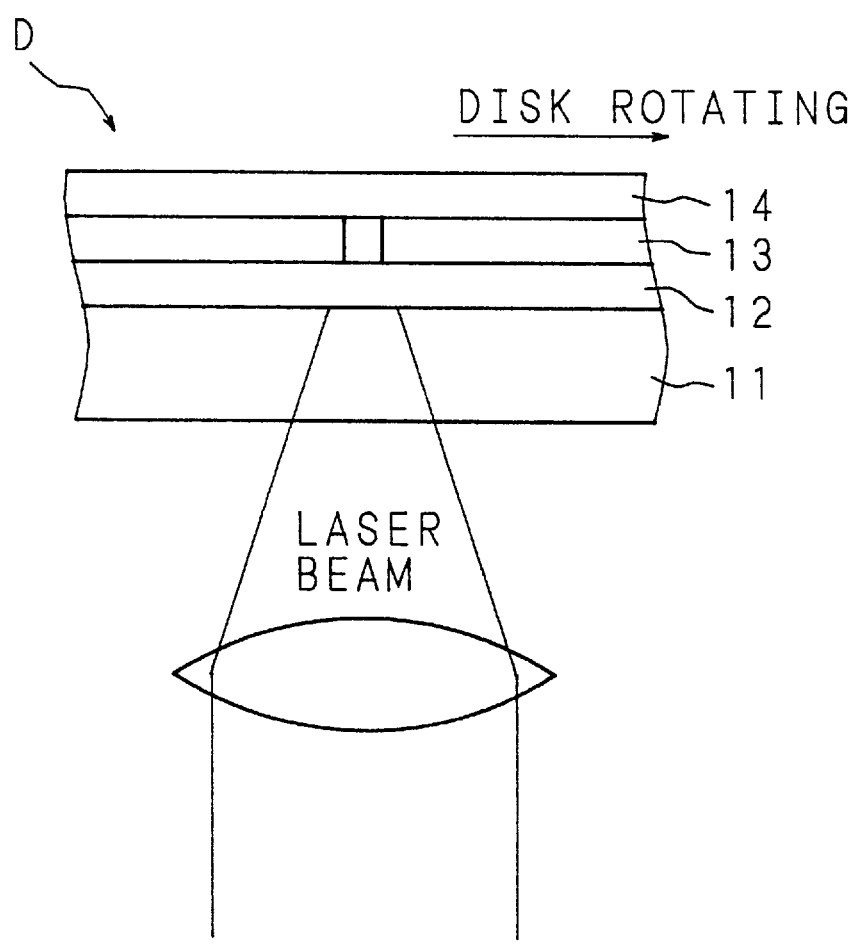
FIG. 9 is a view for illustrating a method of recording the identification information in a third embodiment.

FIG. 9 is a view for illustrating a recording method of identification information of the third embodiment of the invention. The information recording medium D, uses a substrate 11 made of carbonate resin of 1.2 mm in thickness, and φ86 mm in outer diameter, with pregroove of 1.4 μm in track pitch and header signal. It has a structure that a dielectric layer 12 formed of ZnS, a recording layer 13 formed of InSb, and a dielectric layer 14 formed of ZnS are laminated on the substrate 11 in this order by a vacuum evaporation method. The information recording medium D which is a phase-change type disk of such film construction is physically formatted, then the recording layer 13 is crystallized and the signal of the 7 MHz is recorded by 9 m/sec. at linear velocity. The C/N of the signal is saturated with 8 mW of recording power, and the signal has been erased with 5 mW of erasing power. Thereafter, it is confirmed that the signal can be recorded again with 8 mW of recording power, and the writable recording film 13 is formed.

The test pattern is recorded on the information recording medium D with 3 m/sec. of linear velocity, and 20 mW of recording power to form the first sectors 1a, 1a, . . . for recording the identification information 1 same as that of the first embodiment. The test pattern is not erased in the linear velocity 9 m/sec., with 5 mW which is normal erasing power, and is not erased even with 25 mW which is larger power value than it. That is said that the test pattern is recorded irreversibly. The other construction of the information recording medium D, which is similar to that of the FIG. 1, will be omitted in the description.

The medium truth can be judged, thereby causing similar effects respectively by effecting similar reproduction processing procedures with the use of the recording/reproducing apparatus same as that of the first or second embodiment (see FIG. 4 through FIG. 7) for the information recording medium D. The reproducing signal is detected by changes in reflection factor of the irradiation beam in the third embodiment although the reproducing signal is detected in the rotating direction of the polarization face of the irradiation beam in the first and second embodiments.

Fourth Embodiment

Figure 10:
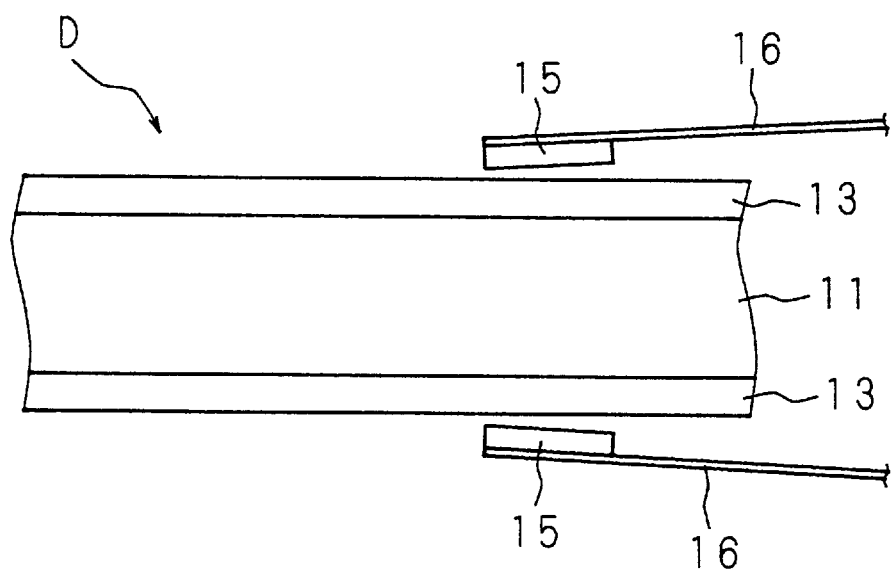
FIG. 10 is a view for illustrating a method of reproducing the identification information in a fourth embodiment.

In the fourth embodiment, a case where the information recording medium D is a removable type magnetic disk including cartridge will be described. FIG. 10 is a view for illustrating a reproducing method of the identification information in the fourth embodiment of the invention. The information recording medium D, using a substrate 11 made of resin, with the pregroove and header signal formed on both faces, is structured to have recording layers 13, 13 formed of CoCr pasted on both face sides of the substrate 1. Arms 16, 16 provided with recording/reproducing apparatus are arranged on the opposite sides of the recording layers 13, 13. The recording/reproducing of the signal is adapted to be effected on the recording layer 13 with magnetic heads 15, 15 mounted on the tip ends of the arms 16, 16 provided with the recording/reproducing apparatus being arranged on the opposite sides of the recording layers 13, 13.

The information recording medium D, a magnetic disk, has the identification information 1, the key recording area information 2, the identification code 3 and the medium firm information 4 recorded, as described in FIG. 1. The identification information 1 is recorded with the first sectors 1a, 1a, . . . being injured with a screw driver or the like on the given sector after the information recording medium D has been formatted physically. Also, the key recording area information 2, the identification code 3 and the medium firm information 4 are recorded with usual magnetic recording.

The medium truth can be judged so that the same effects can be obtained by the execution of the same reproduction processing procedures with the use of the recording/reproducing apparatus same as that of the first embodiment on such a information recording medium D (see FIG. 5 through FIG. 7).

Although a case where the sector is the first unit area recorded irreversibly or injured has been described in the above described embodiment, it is not limited to this. It may form the first unit area with a b it unit of a given number with a plurality of bits being decided as a unit area. FIG. 11 is a partial enlarged view of the information recording medium with the identification information 1 being recorded with the arrangement of the first unit area and the second unit area, of a plurality of bit unit. Referring to the drawing, a reference character A2, a key recording area, has the continuous five sectors of the zero logical sector through the fourth logical sector of the fifth logical track. A case will be described where a front area and a rear area halved in the track direction of each logical sector is made a unit area with each area being corresponded to '1' or '0' respectively.

As shown in the drawing, the front area of the zero and third logical sectors and the rear area of the first and fourth logical sectors are first unit areas 10a, 10a, . . . where the test patterns are recorded irreversibly. The rear areas of the zero and third local sectors, the front areas of the first and fourth local sectors, and the full areas of the second logical sector are the second unit sectors 10b, 10b, . . . where nothing is recorded. The identification information 1 is recorded by the arrangement of the first unit area 10a and the second unit area 10b. The information recording medium is omitted in description because of the other construction of it being same as that of the first embodiment. The effect same as that of each of the above described embodiments can be obtained when the unit area for composing the key recording area A2 where the identification information 1 is recorded is of a plurality of bits of one sector or less, or of one sector or more.

Also, although a case where the information recording medium is a medium disk-shaped like magneto-optical disk, phase-change type disk or magnetic disk has been described in the above embodiments, it is not limited to this, and the similar effect can be obtained when the medium is card-shaped or tape-shaped.

The invention has superior effects in that correct identification information can be reproduced, the medium truth judgment can be effected without fail, and so on even when the reproducing signals of the first unit area are deteriorated, because the key information like the identification information inherent to the medium is recorded by the arrangement of the first unit area recorded irreversibly where the information cannot be recorded normally and the second unit area recorded non-irreversibly where the information can be recorded normally in the invention as described above.

Also, the invention has superior effects in that signals on the medium truth judgment between the recording/reproducing apparatus and the processing apparatus is not transmitted and received, thereby making it difficult to explain the illegal usage preventing function of the information, by effecting the medium truth judgment processing with the use of the medium film information through the confirmation of the existence of the key information in the engagement of the information recording medium with the recording/reproducing apparatus, because the invention is provided with the medium firm information for specific recording/reproducing controlling and the key information for notifying the existence of the medium firm information.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and hounds thereof are therefore intended to be embraced by the claims.

We claim:

1. An information recording medium capable of rewriting information by a recording operation and an erasing operation, comprising:

plural unit areas composed of a plurality of bits on an information recording area, the unit areas having an irreversible unit area(s) recorded irreversibly and a non-irreversible unit area(s) not recorded irreversibly, wherein a predetermined key information is recorded by the arrangement of the irreversible unit area(s) and the non-irreversible unit area(s).

2. The information recording medium according to claim 1, wherein each of the unit areas is a sector determined as an area divided in the length direction of a track which is the information recording area.

3. The information recording medium according to claim 1, wherein the key information is identification information for identifying the medium.

4. An information recording medium capable of rewriting the information by a recording operation and an erasing operation, comprising:

plural unit areas to be defined with addresses on the information recording area, the unit areas having a first unit area(s) where information cannot be recorded normally and a second unit area(s) where information can be recorded normally, wherein a predetermined key information is recorded by the arrangement of the first unit area(s) and the second unit area(s).

5. An information recording medium capable of rewriting the information by a recording operation and an erasing operation, comprising:

plural unit areas composed of a plurality of bits on an information recording area, wherein a medium firm information for specific recording/reproducing control and a key information indicating the existence of the medium firm information are recorded in one or a plurality of unit areas.

6. The information recording medium according to claim 5, wherein the key information is recorded by the arrangement of a first unit area(s) where information cannot be recorded normally and a second unit area(s) where information can be recorded normally.

7. The information recording medium according to claim 5, wherein the key information is identification information for identifying the medium.

8. An information recording medium capable of rewriting information by a recording operation and an erasing operation, comprising:

plural unit areas composed of a plurality of bits on an information recording area, wherein in the information recording area, a key information recorded by the arrangement of a first unit area(s) where information cannot be recorded normally and a second unit area(s) where information can be recorded normally;

address information showing the address of an area where the key information is recorded; and a judging program having a step of reading out the address information to effect an erasing operation on the area where the key information is recorded, a step of reproducing the area where the erasing operation is effected, and a step of judging whether or not reproduction is effected normally in each unit area to correspond to binary values the result of whether or not normal reproduction is effected, are recorded.

9. The information recording medium according to claim 8, wherein the judging program has a step of judging the agreement between the information corresponding to binary values and the information recorded in advance.

10. An information recording medium capable of rewriting information by a recording operation and an erasing operation, comprising:

plural unit areas composed of a plurality of bits on an information recording area, wherein in the information recording area, a key information recorded by the arrangement of a first unit area(s) where information cannot be recorded normally and a second unit area(s) where information can be recorded normally;

address information showing the address of an area where the key information is recorded; and a judging program having a step of reading out the address information to effect an erasing operation on the area where the key information is recorded, a step of recording the predetermined information in the area where the erasing operation is effected, a step of reproducing the area where the predetermined information is recorded, and a step of judging whether or not reproduction is effected normally in each unit area to correspond to binary values the result of whether or not normal reproduction is effected, are recorded.

11. The information recording medium according to claim 10, wherein the judging program has a step of judging the agreement between the information corresponding to binary values and the information recorded in advance.

12. A method of reproducing the information recording medium capable of rewriting information by a recording operation and an erasing operation, comprising the steps of:

preparing an information recording medium where plural unit areas to be defined with addresses on an information recording area is provided with, a first unit area(s) where information cannot be recorded normally and a second unit area(s) where information can be recorded normally being formed on the unit areas, and a predetermined key information being recorded by the arrangement of the first unit area(s) and the second unit area(s);

effecting an erasing operation on the area where the key information is recorded;

reproducing the area upon which the erasing operation is effected;

judging whether or not the reproduction is effected normally on each unit area; and deciding respectively whether it is the first unit area or the second unit area in accordance with the normal acceptability judgment.

13. A method of reproducing the information recording medium capable of rewriting information by a recording operation and an erasing operation, comprising the steps of:

preparing an information recording medium where plural unit areas to be composed of a plurality of bits on an information recording area is provided, a medium firm information for the specific recording/reproducing control, and a key information indicating the existence of the medium firm information are recorded in the information recording area, with the key information being recorded by the arrangement between a first unit area(s) where information cannot be recorded normally and a second unit area(s) where information can be recorded normally;

effecting the erasing operation on the area where the key information is recorded;

reproducing the area where the erasing operation is effected;

judging whether or not the reproduction is effected normally in each unit area; and deciding respectively whether it is the first unit area or the second unit area in accordance with the result of normal judgment.

14. The method of reproducing the information recording medium according to claim 12, further comprising the step of, recording the predetermined information on the area where the erasing operation is effected prior to the step of reproducing, and wherein the reproducing operation is effected on the area where the predetermined information is recorded.

15. The method of reproducing the information recording medium according to claim 13, further comprising the step of, recording the predetermined information on the area where the erasing operation is effected prior to the step of reproducing, and wherein the reproducing operation is effected on the area where the predetermined information is recorded.

16. A method of judging the truth of the information recording medium capable of rewriting information by a recording operation and an erasing operation, comprising the steps of:

preparing an information recording medium where plural unit areas to be defined with addresses on an information recording area is provided with, a first unit area(s) where information cannot be recorded normally and a second unit area(s) where information can be recorded normally being formed on the unit areas, and a predetermined key information being recorded by the arrangement of the first unit area(s) and the second unit area(s);

effecting an erasing operation on the area where the key information is recorded;

reproducing the area upon which the erasing operation is effected;

judging whether or not the reproduction is effected normally on each unit area to correspond to binary values the result of whether or not the normal reproduction is effected;

judging the agreement between the information corresponding to the binary values and the information recorded in advance; and deciding the truth of the information recording medium in accordance with the result of the agreement judgment.

17. A method of judging the truth of the information recording medium capable of rewriting information by a recording operation and an erasing operation, comprising the steps of:

preparing an information recording medium where plural unit areas to be composed of a plurality of bits on an information recording area is provided with, a medium firm information for the specific recording/reproducing control and a key information indicating the existence of the medium firm information being recorded in the information recording area, the key information being recorded by the arrangement between a first unit area(s) where information cannot be recorded normally and a second unit area(s) where information can be recorded normally;

effecting the erasing operation on the area where the key information is recorded;

reproducing the area upon which the erasing operation is effected;

judging whether or not the reproduction is effected normally in each unit area to correspond to binary values the result of whether or not the normal reproduction is effected;

judging the agreement between the information corresponding to the binary values and the information recorded in advance; and deciding the truth of the information recording medium in accordance with the result of the agreement judgment.

18. The method of judging the truth of the information recording medium according to claim 16, further comprising the step of, recording the predetermined information on the area where the erasing operation is effected prior to the step of reproducing, and wherein the reproducing operation is effected on the area where the predetermined information is recorded.

19. The method of judging the truth of the information recording medium according to claim 17, further comprising the step of, recording the predetermined information on the area where the erasing operation is effected prior to the step of reproducing, and wherein the reproducing operation is effected on the area where the predetermined information is recorded.

20. A recording/reproducing apparatus for effecting recording/reproducing processing in an information recording medium, comprising:

a first memory part for storing original firm information for controlling the recording/reproducing of information;

a judging part for judging the existence of a key information indicating the existence of the medium firm information for controlling the specific recording/reproducing in the information recording medium;

a second memory part in which the medium firm information is read and stored when the information recording medium is judged to have the key information by the judging part; and an instructing part for instructing the switching of the original firm information and the medium firm information for the usage thereof.

21. The recording/reproducing apparatus according to claim 20, wherein the key information is identification information for identifying the medium, and a third memory part where the identification information is read and stored when the judgement part has judged the existence of the identification information, is further provided.

* * * * *